(12) United States Patent
Elkenkamp (10) Patent No.: US 10,406,923 B2
(45) Date of Patent: Sep. 10, 2019

(54) GPS ASSIST IN REGENERATIVE BRAKING

(71) Applicant: Faraday & Future Inc., Gardena, CA (US)

(72) Inventor: Marco Elkenkamp, Marina Del Rey, CA (US)

(73) Assignee: FARADA & FUTURE INC., Gardena, CA (US)

( * ) Notice: Subject to any disclaimer, the term of this patent is extended or adjusted under 35 U.S.C. 154(b) by 0 days.

(21) Appl. No.: 15/274,883

(22) Filed: Sep. 23, 2016

(65) Prior Publication Data

US 2017/0087993 A1    Mar. 30, 2017

Related U.S. Application Data

(60) Provisional application No. 62/233,177, filed on Sep. 25, 2015.

(51) Int. Cl.
| | |
|---|---|
| *B60L 7/26* | (2006.01) |
| *B60L 15/20* | (2006.01) |
| *B60T 8/58* | (2006.01) |
| *B60T 1/10* | (2006.01) |
| *B60T 7/18* | (2006.01) |

(Continued)

(52) U.S. Cl.
CPC .............. *B60L 7/26* (2013.01); *B60L 7/10* (2013.01); *B60L 7/18* (2013.01); *B60L 15/2018* (2013.01); *B60T 1/10* (2013.01); *B60T 7/18* (2013.01); *B60T 8/58* (2013.01); *B60L 2240/622* (2013.01); *B60L 2240/642* (2013.01); *B60L 2240/70* (2013.01); *B60T 2201/04* (2013.01); *B60T 2210/36* (2013.01); *B60T 2270/604* (2013.01); *Y02T 10/645* (2013.01); *Y02T 10/72* (2013.01); *Y02T 10/7275* (2013.01);

(Continued)

(58) Field of Classification Search
CPC ...... B60L 7/26; B60L 7/10; B60L 7/18; B60L 15/2018; B60L 2240/70; B60L 2240/622; B60L 2240/642; B60T 7/18; B60T 1/10; B60T 8/58; B60T 2270/604; B60T 2201/04; B60T 2210/36; Y02T 10/72; Y02T 90/16; Y02T 10/7291; Y02T 10/7275; Y02T 90/162; Y02T 10/645
USPC .......................................................... 701/70
See application file for complete search history.

(56) References Cited

U.S. PATENT DOCUMENTS

| 6,076,899 A * | 6/2000 | Isella ................ B60L 7/24 188/159 |
| 9,321,355 B1 * | 4/2016 | Shah ................ B60L 7/18 |

(Continued)

FOREIGN PATENT DOCUMENTS

| DE | 19607823 | * 8/1997 ............ B60L 7/26 |

*Primary Examiner* — Muhammad Shafi
(74) *Attorney, Agent, or Firm* — Veros Legal Solutions, LLP (57) ABSTRACT

A regenerative braking system and method are disclosed. According to certain embodiments, the regenerative braking system is engaged and adjusted when the navigation system recognizes that the vehicle is descending down a long grade. This can be pre-stored information, or information derived from prior experience or from the shared experiences of other drivers. The regenerative braking system does not engage to the full stop of the vehicle, but instead can release at approximately three mph and allows friction braking to handle the rest of the stop. The navigation system in this embodiment recognizes that a stop sign or other full-stop situation is present.

8 Claims, 5 Drawing Sheets

(51) Int. Cl.
*B60L 7/10* (2006.01)
*B60L 7/18* (2006.01)

(52) U.S. Cl.
CPC ............ *Y02T 10/7291* (2013.01); *Y02T 90/16* (2013.01); *Y02T 90/162* (2013.01)

(56) References Cited

U.S. PATENT DOCUMENTS

2011/0246012 A1 10/2011 McClain
2015/0019058 A1 1/2015 Georgiev
2018/0093572 A1* 4/2018 Hall .......................... B60T 1/10

* cited by examiner

FIGURE 5

GPS ASSIST IN REGENERATIVE BRAKING

CROSS REFERENCE TO RELATED APPLICATIONS

This application claims the benefit of priority from U.S. Provisional Patent Application No. 62/233,177 filed on Sep. 25, 2015, the entire disclosure of which is incorporated by reference.

TECHNICAL FIELD

The present disclosure relates generally to the field of vehicle systems, and more particularly, to systems and methods for regenerative braking.

BACKGROUND

Many types of vehicles currently employ regenerative braking systems in combination with conventional friction braking systems. Electric trains have used such systems for many years, and the more recent advent of hybrid and electric automobiles, trucks and buses has expanded the use of these dual braking systems. Even certain race cars are equipped with dual braking systems, most notably the kinetic energy recovery systems used in Formula One.

SUMMARY

One aspect of the present disclosure is directed to a method for stopping a moving vehicle. The method may include receiving a signal from a sensor indicative of that the moving vehicle has initiated a descent. The method may also include associating the signal with a location provided by a global positioning system (GPS) for tracking the descent. The method may also include activating, by a system controller, a regenerative braking system when the location is in a regenerative braking zone. The method may also include determining, by the system controller, a speed of the moving vehicle based on the descent tracked by the GPS. The method may further include activating, by the system controller, a friction braking system and releasing, by the system controller, the regenerative braking system during the descent when the speed of the moving vehicle reaches a predetermined speed.

Another aspect of the present disclosure is directed to a method for stopping a moving vehicle. The method may include receiving a first signal from a first sensor indicating that the moving vehicle has initiated a descent, wherein a regenerative braking system of the moving vehicle is activated after the descent starts. The method may also include associating the first signal with a first location provided by a global positioning system (GPS) for tracking the decent. The method may also include determining, by a system controller, a speed of the moving vehicle based on the descent tracked by the GPS. The method may also include activating, by the system controller, a friction braking system and releasing, by the system controller, the regenerative braking system during the descent when the speed of the moving vehicle reaches a predetermined speed. The method may also include receiving a second signal from a second sensor indicating that the moving vehicle has stopped moving. The method may also include associating the second signal with a second location provided by the GPS. The method may also include recording, by the system controller, the descent tracked by the GPS, the speed of the moving vehicle during the descent, status of the regenerative braking system during the descent, and the first and the second locations in a memory. The method may further include transmitting, by the system controller, to an intelligent agent the descent tracked by the GPS, the speed of the moving vehicle during the descent, the status of the regenerative braking system during the descent, and the first and the second locations.

Yet another aspect of the present disclosure is directed to a system for stopping a moving vehicle. The system may include an intelligent agent being communicatively coupled over a network to a first system controller on a first vehicle and a second system controller on a second vehicle. The intelligent agent may be configured to: receive from the first system controller a descent of the first vehicle tracked by a global positioning system (GPS), speed of the first vehicle during the descent, status of a braking system of the first vehicle during the descent, and a first location and a second location of the first vehicle during the descent; receive a second system controller an intended travel plan for the second vehicle; and when the intended travel plan corresponds to the decent of the first vehicle, transmit to the second system controller the descent of the first vehicle tracked by the GPS, the speed of the first vehicle during the descent, the status of the braking system of the first vehicle during the descent, and the first and the second locations of the first vehicle during the descent.

DETAILED DESCRIPTION

Regenerative braking systems use a mechanism to convert a portion of the kinetic energy of a moving vehicle into a usable form of energy. In contrast, kinetic energy is lost as heat in friction braking systems. Most regenerative braking systems use an electric motor as a generator to convert the kinetic energy into electric energy that can be recovered to the power grid (for electric trains), consumed immediately by other electric components on the vehicle, or stored in batteries or capacitors. Other systems can use a flywheel to store the recovered energy.

Regenerative braking systems are actuated when the vehicle operator presses the brake pedal. Systems within the vehicle determine the amount of frictional braking and the amount of regenerative braking that will be used at any given time. This leads to inefficiencies because there are situations where most, if not all, of the braking duty can be handled by the regenerative braking system, but the vehicle systems do not allow this to happen due to safety or other concerns. These safety concerns are a result of the vehicle systems being unaware of the circumstances leading to the braking of the vehicle. The vehicle systems do not know if the operator desires to merely slow the vehicle or bring the vehicle to a complete stop.

The present disclosure is directed to systems and methods for stopping a moving vehicle. Regenerative braking systems are limited in their efficiency because there are situations where most, if not all, of the braking duty can be handled by the regenerative braking system, but the vehicle systems do not allow this to happen due to safety or other concerns. One situation which can be well defined where total or near total regenerative braking can be used is when the vehicle is descending down a grade and there is a stop sign or stoplight at the bottom of the grade. An inclinometer can be integrated into the vehicle's systems to determine when the vehicle is traveling down a grade. If the vehicle operator engages the brake while traveling down the grade, the vehicle systems can recognize this situation based on the inclinometer reading, and braking could be handled by the regenerative braking system. However, the inclinometer is not able to provide information on whether there is a stop sign or stoplight at the end of the grade and safety concerns can dictate less than full use of the regenerative braking system.

The situational and location information needed by the vehicle systems to determine when full regenerative braking can be used can be provided by a global positioning system (GPS) sensor integrated into the vehicle systems. The map data available to the GPS commonly includes intersections and stop sign and stoplight locations. If stop sign and stoplight information is not available on a particular GPS, then such can be inferred by the type of roads intersecting (e.g., a road ending at a T-intersection can be presumed to have a stop sign or stoplight, and an interstate highway can be presumed not to have a stop sign or stoplight where it intersects another road).

Figure 1:
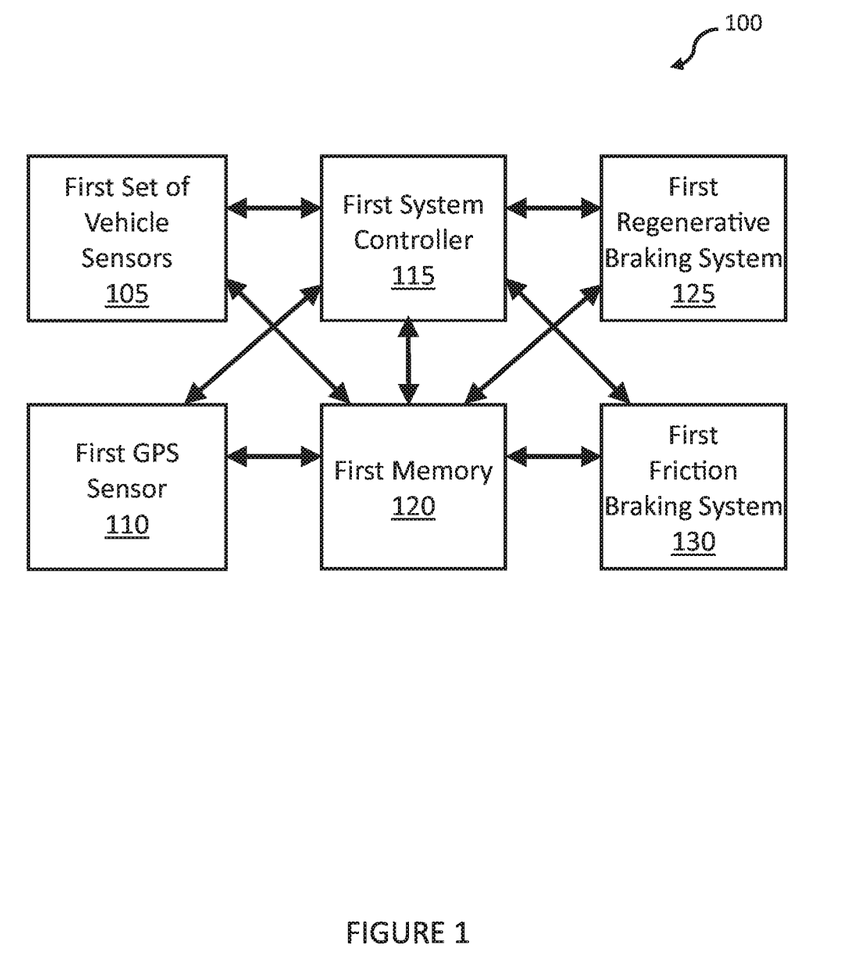
FIG. 1 is a schematic diagram of a system to stop a moving vehicle according to various embodiments.

FIG. 1 illustrates various embodiments of a system 100 for stopping a moving regenerative braking system-equipped vehicle incorporating a GPS function. The vehicle can be equipped with a first set of vehicle sensors 105 and a first on-board GPS sensor 110. The first set of vehicle sensors 105 can comprise, for example, a speed sensor, a brake pedal actuation sensor (which can also sense the level of actuation), a wheel rotation sensor, a steering position sensor, and a proximity sensor for objects outside the vehicle. The first set of vehicle sensors 105 can also comprise other vehicle sensors that sense conditions of the vehicle itself and vehicle subsystems such as engine, electrical, fuel distribution, and the like. The first GPS sensor 110 can determine, for example, the location of the vehicle, track the descent of the vehicle down the grade, track the location of the vehicle relative to a stop sign or stoplight, and track the speed of the vehicle.

The first set of vehicle sensors 105 and the first GPS sensor 110 can be communicatively coupled to a first system controller 115 and a first memory 120. Additionally, the first system controller 115 and the first memory 120 can be communicatively coupled to one another. The first system controller 115 can receive input from the first set of vehicle sensors 105 and the first GPS sensor 110 and control operation of a first regenerative braking system 125 and a first friction braking system 130. The first system controller 115, according to various embodiments, can comprise a specialized chip, such as an application-specific integrated circuit (ASIC) chip, programmed with logic as described herein to operate the elements of the system 100. The programmed logic can comprise instructions for operating the first regenerative braking system 125 and the first friction braking system 130 in response to one or more inputs.

Figure 2:
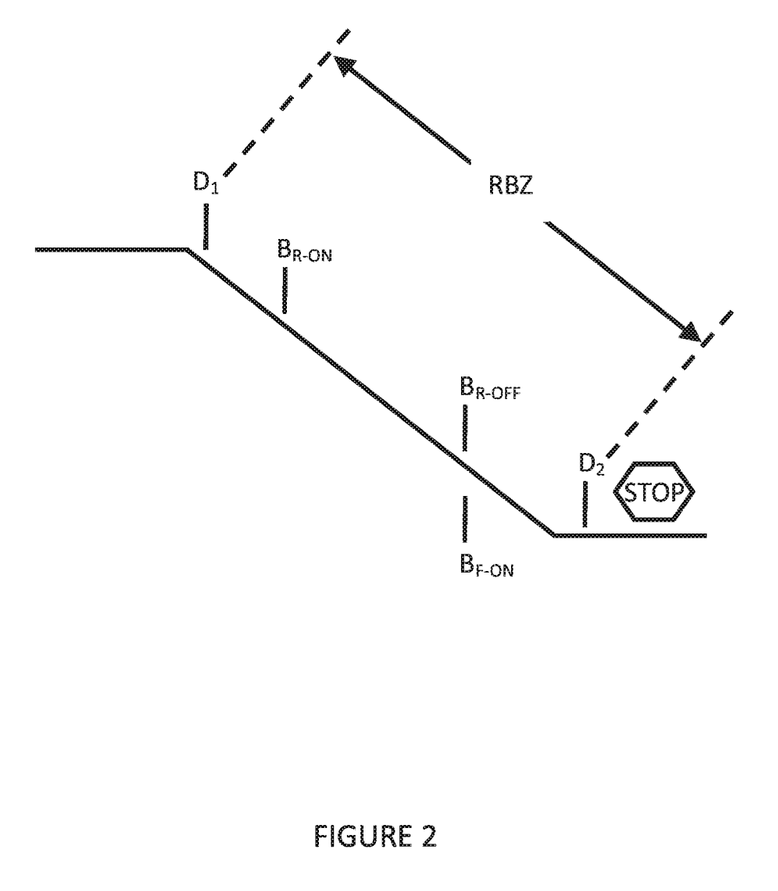
FIG. 2 is a graphical representation of a grade with a regenerative braking zone according to various embodiments.

FIG. 2 along with FIG. 1 illustrate operation of various embodiments of the system 100. As a moving vehicle begins to descend a grade, one or more of the first set of vehicle sensors 105 can sense that the vehicle is moving down the grade and can initiate a signal which can be received by the first system controller 115. The first system controller 115 can receive a location (indicated by $D_1$ in FIG. 2) of the moving vehicle from the first on-board GPS sensor 110 when the signal was received. The first GPS sensor 110 and/or the first system controller 115 can determine whether the location $D_1$ is in a regenerative braking zone (indicated by RBZ in FIG. 2). A regenerative braking zone can be a descending grade with a stop sign or stoplight (or other situation that requires the vehicle to stop) at the end of the grade in which regenerative braking can be used for nearly all of the braking duty of the moving vehicle. If the location $D_1$ is determined to be in a regenerative braking zone, then the first system controller 115 can activate and engage the first regenerative braking system 125 (indicated by $B_{R-ON}$ in FIG. 2). The first GPS sensor 110 can track the descent of the vehicle through the regenerative braking zone, and the first system controller 115 can associate the tracked descent with a speed of the moving vehicle during the tracked descent. The first system controller 115 can maintain the engagement status of the first regenerative braking system 125 during the descent until the velocity of the moving vehicle is reduced to a predetermined value. The first system controller 115 can modulate the first regenerative braking system 125 to achieve a desired rate of deceleration during the tracked descent. Once the predetermined velocity is achieved, the first system controller 115 can release the engagement status of the first regenerative braking system 125 (indicated by $B_{R-OFF}$ in FIG. 2). In various embodiments, the predetermined velocity can be approximately 3 miles per hour (mph); however, one skilled in the art will recognize that other velocities, both greater than and less than 3 mph, are within the scope of the present disclosure. Just prior to releasing the first regenerative braking system 125, the first system controller 115 can activate an engagement status of the first friction braking system 130 (indicated by $B_{F-ON}$ in FIG. 2). The moving vehicle can then be brought to a stop by the first friction braking system 130 at the regenerative braking zone endpoint (indicated by $D_2$ in FIG. 2).

The locations of regenerative braking zones can be pre-stored in the first memory 120 or in the first GPS sensor 110. The locations can be in the form of latitude and longitude coordinates, Universal Transverse Mercator (UTM) coordinates, Military grid reference system (MGRS) coordinates, United States National Grid (USNG) coordinates, Global Area Reference System (GARS) coordinates, World Geographic Reference System (GEOREF) coordinates, or any other geographic coordinate system.

Figure 3:
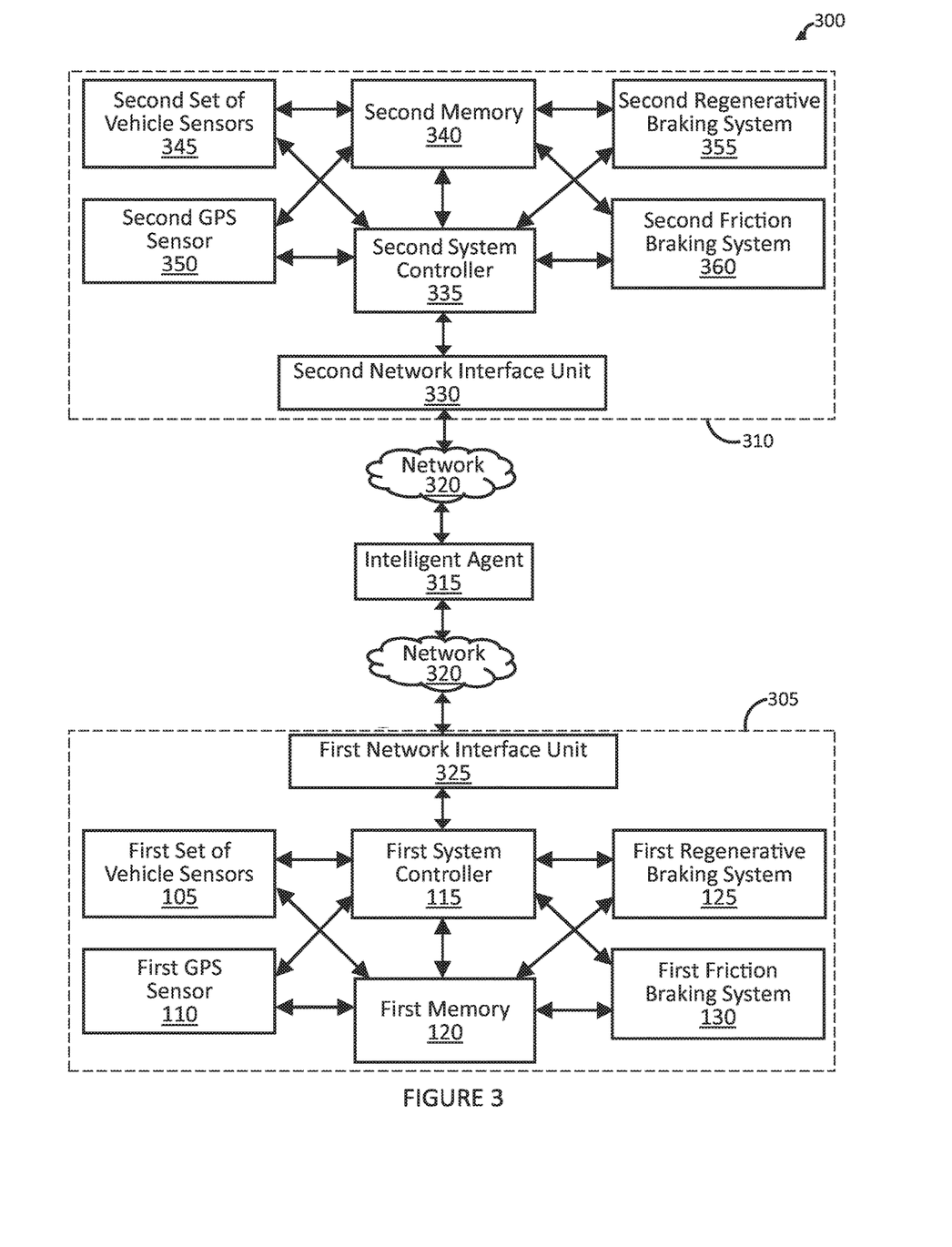
FIG. 3 is a schematic diagram of a system to stop a moving vehicle with input from a second vehicle according to various embodiments.

In some embodiments, as illustrated in FIG. 3 along with FIGS. 1 and 2, the locations can be derived from prior experience or from the shared experience of other drivers. System 300 of FIG. 3 can comprise a first vehicle 305 with first set of vehicle sensors 105, first GPS sensor 110, first system controller 115, first memory 120, first regenerative braking system 125 and first friction braking system 130 as described above.

Additionally, the first vehicle 305 can further comprise a first network interface unit 325 communicatively coupled to the first system controller 115, through which the first system controller 115 can communicate via a network 320 with one or more intelligent agents 315. The network 320 can be a cellular network, the Internet, an Intranet, or other suitable communications network, and can be capable of supporting communication in accordance with any one or more of a number of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth, Wireless LAN (WLAN) protocols/techniques.

The system 300 can further comprise, according to various embodiments, a second vehicle 310 with a second set of vehicle sensors 345, second GPS sensor 350, second system controller 335, second memory 340, second regenerative braking system 355, and second friction braking system 360 similar to corresponding elements on the first vehicle 305. The second vehicle 310 can also comprise a second network interface unit 330 communicatively coupled to the second system controller 335, through which the second system controller 335 can communicate via the network 320 with the one or more intelligent agents 315. The second system controller 335, according to various embodiments, can comprise a specialized chip, such as an ASIC chip, programmed with logic as described herein to operate the elements of the system 300. The programmed logic can comprise instructions for operating the second regenerative braking system 355 and the second friction braking system 360 in response to one or more inputs.

In various embodiments involving the first vehicle 305 and the second vehicle 310, in which at least the first vehicle 305 is moving, the first vehicle 305 can descend a grade in the manner described above for the system 100 with reference to FIG. 2. As the first vehicle 305 progresses down the grade and the first system controller 115 activates the first regenerative braking system 125 and the first friction braking system 130, the first system controller 115 can track the descent of the first vehicle 305, speed of the first vehicle 305 during the tracked descent, the beginning point $D_1$ of the regenerative braking zone RBZ, the endpoint $D_2$ of the regenerative braking zone RBZ, the location $B_{R-ON}$ at which the first regenerative braking system 125 was engaged, the location $B_{R-OFF}$ at which the first regenerative braking system 125 was disengaged, and the location $B_{F-ON}$ at which the first friction braking system 130 was engaged (collectively referred to as the "tracked descent data"). The tracked descent data can be stored in the first memory 120. The first system controller 115 can transmit over the network 320 via the first network interface unit 325 the tracked descent data stored in the first memory 120 to the intelligent agent 315. Alternatively, the first system controller 115 can transmit the tracked descent data to the intelligent agent 315 directly without storing the information in the first memory 120.

The second vehicle 310, which can be communicatively coupled to the intelligent agent 315 over the network 320 via the second network interface unit 330, can transmit to the intelligent agent 315 an intended travel plan for the second vehicle 310. The intended travel plan can be entered manually into the second system controller 335, or it can be generated by the second GPS sensor 350 such as when a desired destination is entered into the second GPS sensor 350 which then calculates a recommended route. The intelligent agent 315 can then determine whether any of the tracked descents received from the first vehicle 305 are located along the intended travel plan for the second vehicle 310. If so, the intelligent agent 315 can transmit the tracked descent data over the network 320 to the second system controller 335, which can then store the tracked descent data in the second memory 340 or in the second GPS sensor 350. The second system controller 335 can then recall the stored tracked descent data when the second vehicle 310 reaches the grade and can use the tracked descent data to operate the second regenerative braking system 355 and the second friction braking system 360.

The intelligent agent 315, according to some exemplary embodiments, can be a non-generic computing device comprising non-generic computing components. The intelligent agent 315 can comprise dedicated hardware processors to determine, transmit, and receive video and non-video data elements. In further exemplary embodiments, the intelligent agent 315 comprises a specialized device having circuitry and specialized hardware processors, and can be artificially intelligent, including machine learning. Numerous determination steps by the intelligent agent 315 as described herein can be made to video and non-video data by an automatic machine determination without human involvement, including being based on a previous outcome or feedback (e.g., automatic feedback loop) provided by the networked architecture, processing and/or execution as described herein.

The systems 100, 300 can be installed in any type of land-based moving vehicle, including automobiles, trucks, buses, and the like. The systems 100, 300 can also be installed in trains to assist in navigating steep grades, as well as airplanes to assist in bringing the plane to a stop at the terminal.

Figure 4:
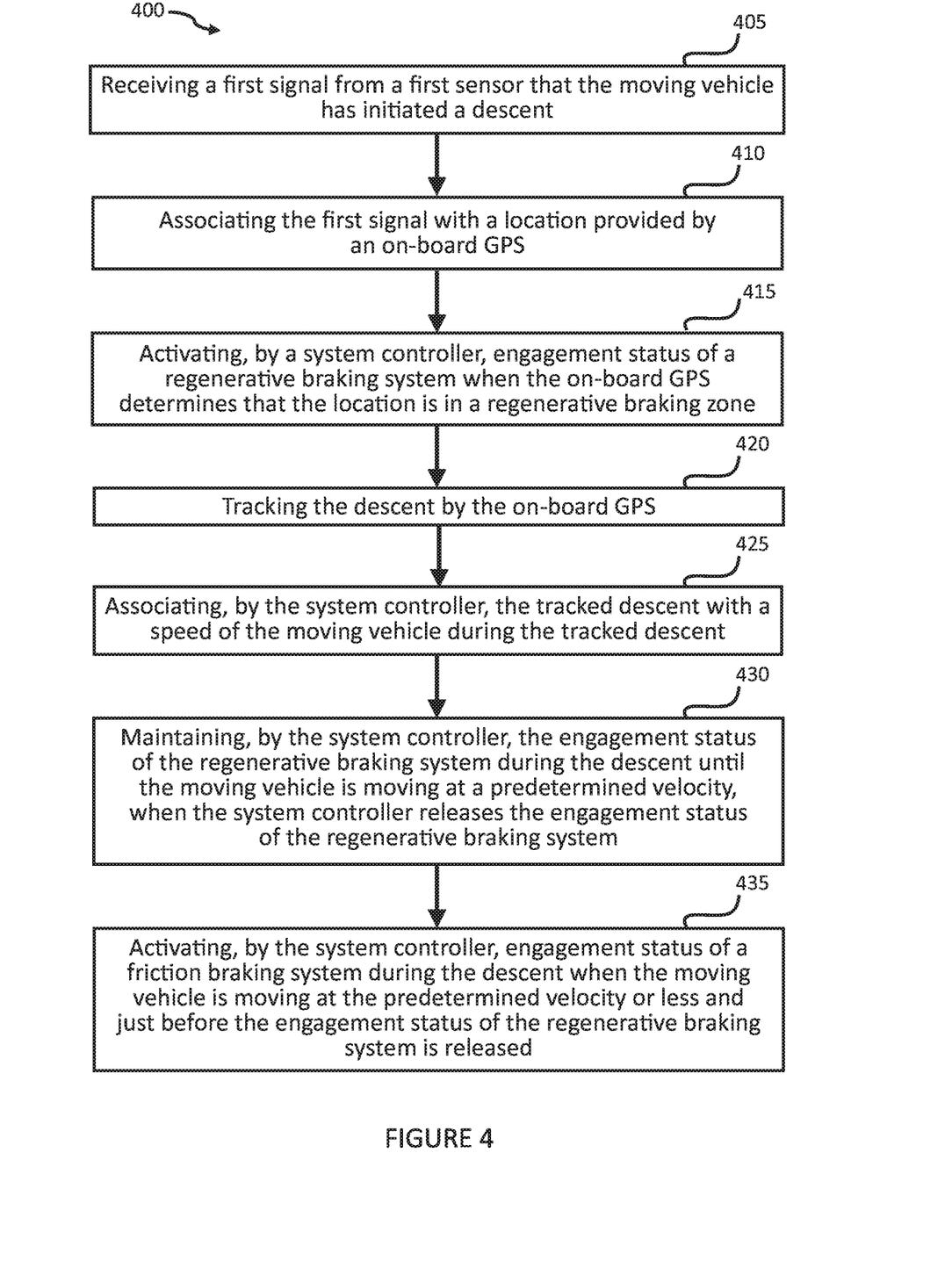
FIG. 4 is a flow diagram of an exemplary method for stopping a moving vehicle according to various embodiments.

FIG. 4 is a flowchart of an exemplary method 400 for stopping a moving vehicle. At step 405, as illustrated in FIG. 4 and FIGS. 1 and 2, a first signal can be received from a first sensor 105 on the moving vehicle. The signal can indicate that the moving vehicle has initiated a descent. The first signal can be associated at step 410 with a location provided by a first on-board global positioning system (GPS) 110. At step 415, a first system controller 115 on the moving vehicle can activate an engagement status of a first regenerative braking system 125 when the first GPS 110 determines the location is in a regenerative braking zone. The first GPS 110 can track the descent of the vehicle at step 420. At step 425, the first system controller 115 can associate the tracked descent with a speed of the moving vehicle during the tracked descent. The first system controller 115 at step 430 can maintain the engagement status of the first regenerative braking system 125 during the descent until the moving vehicle is moving at a predetermined velocity, whereupon the first system controller 115 can release the engagement status of the first regenerative braking system 125. At step 435, the first system controller 115 can activate an engagement status of a first friction braking system 130 during the descent when the moving vehicle is moving at the predetermined velocity or less and just before the engagement status of the first regenerative braking system 125 is released.

Figure 5:
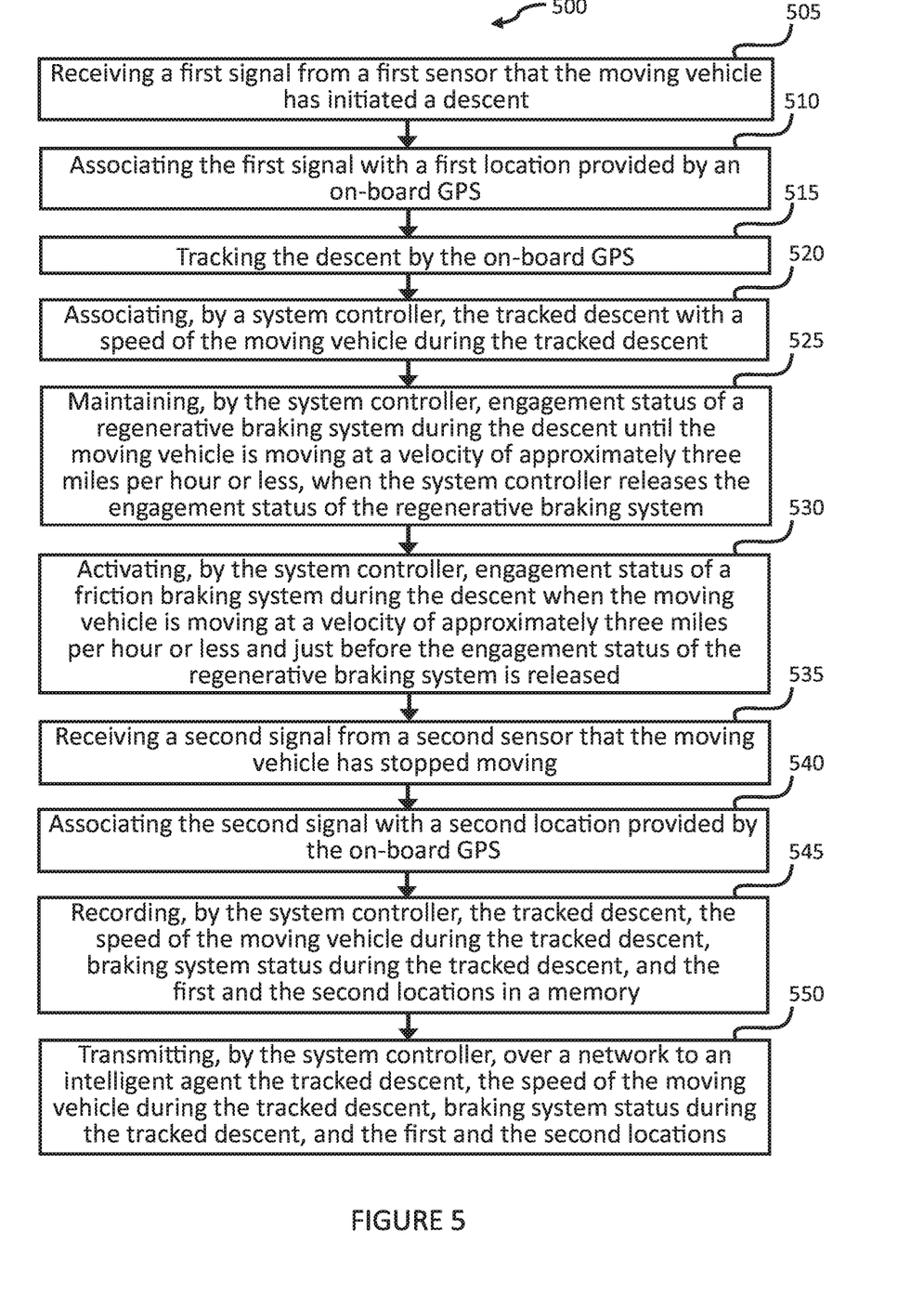
FIG. 5 is a flow diagram of an exemplary method for stopping a moving vehicle according to various embodiments.

FIG. 5 is a flowchart of an exemplary method 500 for stopping a moving vehicle. At step 505, as illustrated in FIG. 4 and FIGS. 1 through 3, a first signal can be received from a first sensor 105 on the moving vehicle. The signal can indicate that the moving vehicle has initiated a descent. At step 510, the first signal can be associated with a first location $D_1$ provided by a first on-board global positioning system (GPS) 110. The descent can be tracked by the first GPS 110 at step 515. A first system controller 115 on the moving vehicle can associate at step 520 the tracked descent with a speed of the moving vehicle during the tracked descent. The first system controller 115 can maintain an engagement status of a first regenerative braking system 125 during the descent until the moving vehicle is moving at a velocity of approximately 3 mph or less at step 525, whereupon the first system controller 115 can release the engagement status of the first regenerative braking system 125. At step 530, the first system controller 115 can activate an engagement status of a first friction braking system 130 during the descent when the moving vehicle is moving at a velocity of approximately 3 mph or less and just before the engagement status of the first regenerative braking system 125 is released. A second signal can be received at step 535 from a second sensor 105 on the moving vehicle indicating that the vehicle has stopped moving. At step 540, the second signal can be associated with a second location $D_2$ provided by the first GPS 110. The first system controller 115 can record at step 545 the tracked descent, the speed of the moving vehicle during the tracked descent, braking system 125, 130 status during the tracked descent, and the first location $D_1$ and the second location $D_2$ in a first memory 120. At step 550, the first system controller 115 can transmit over a network 320 to an intelligent agent 315 the tracked descent, the speed of the moving vehicle during the tracked descent, braking system 125, 130 status during the tracked descent, the first location $D_1$ and the second location $D_2$.

According to various embodiments, the first system controller 115 and the second system controller 335 can communicate with a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource can be utilized exclusively by their owners, such as Google™ or Amazon™, or such systems can be accessible to outside users who deploy applications within the computing infrastructure to obtain the benefits of large computational or storage resources.

The cloud can be formed, for example, by a network of web servers with each server (or at least a plurality thereof) providing processor and/or storage resources. These servers can manage workloads provided by multiple users (e.g., cloud resource customers or other users). Typically, each user places workload demands upon the cloud that vary in real-time, sometimes dramatically. The nature and extent of these variations typically depend upon the type of business associated with each user.

Some of the above-described functions can be composed of instructions that can be stored on storage media (e.g., computer-readable media). The instructions can be retrieved and executed by the processor. Some examples of storage media can be memory devices, tapes, disks, and the like. The instructions can be operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media can include, for example, optical or magnetic disks, such as a fixed disk. Volatile media can include dynamic memory, such as system RAM. Transmission media can include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media can include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

What is claimed is:

1. A method for stopping a moving vehicle, the method comprising:
   receiving a signal from a sensor indicative of that the moving vehicle has initiated a descent;
   associating the signal with a location provided by a global positioning system (GPS) for tracking the descent;
   activating, by a system controller, a regenerative braking system when the location is in a regenerative braking zone;
   determining, by the system controller, a speed of the moving vehicle based on the descent tracked by the GPS; and
   activating, by the system controller, a friction braking system and releasing, by the system controller, the regenerative braking system during the descent when the speed of the moving vehicle reaches a predetermined speed.

2. The method of claim 1, wherein receiving the sensor is an inclinometer.

3. The method of claim 1, further comprising:
   determining that the location is in a regenerative braking zone by comparing the location with known regenerative braking zone locations.

4. The method of claim 1, further comprising:
   modulating by the system controller an amount of regenerative braking to achieve a predetermined rate of deceleration.

5. The method of claim 4, further comprising:
   modulating the amount of regenerative braking to achieve the predetermine speed when the moving vehicle moves in close proximity to an end point of the regenerative braking zone.

6. The method of claim 1, wherein the predetermined speed is about three miles per hour.

7. The method of claim 1, further comprising:
   recording by the system controller the location, the descent tracked by the GPS, status of the regenerative braking system during the descent, and the speed of the moving vehicle during the descent.

8. The method of claim 7,
   wherein the moving vehicle is a first vehicle; and
   wherein the method further comprises:
      transmitting, by the system controller to a second system controller of a second vehicle, the location, the descent tracked by the GPS, the status of the regenerative braking system during the descent, and the speed of the first vehicle during the descent.

* * * * *